(12) United States Patent
Haltmar

(10) Patent No.: US 12,503,838 B2
(45) Date of Patent: Dec. 23, 2025

(54) METHOD AND CONTROLLER FOR OPERATING A WATER SYSTEM AND WATER SYSTEM

(71) Applicant: PITTWAY SARL, Rolle (CH)

(72) Inventor: Bretislav Haltmar, Menin (CZ)

(73) Assignee: PITTWAY SARL, Rolle (CH)

( * ) Notice: Subject to any disclaimer, the term of this patent is extended or adjusted under 35 U.S.C. 154(b) by 181 days.

(21) Appl. No.: 17/997,417

(22) PCT Filed: Apr. 27, 2021

(86) PCT No.: PCT/EP2021/060962
§ 371 (c)(1),
(2) Date: Oct. 28, 2022

(87) PCT Pub. No.: WO2021/224065
PCT Pub. Date: Nov. 11, 2021

(65) Prior Publication Data
US 2023/0167631 A1    Jun. 1, 2023

(30) Foreign Application Priority Data
May 6, 2020    (EP) .................................... 20173085

(51) Int. Cl.
*E03B 1/04*    (2006.01)
*E03B 7/04*    (2006.01)
(52) U.S. Cl.
CPC ................ *E03B 1/042* (2013.01); *E03B 7/04* (2013.01)
(58) Field of Classification Search
CPC ............. E03B 1/041; E03B 1/042; E03B 7/04

USPC .................... 4/317, 318, 602, 603, 625, 626
See application file for complete search history.

(56) References Cited

U.S. PATENT DOCUMENTS

| | | | |
|---|---|---|---|
| 4,162,218 A | 7/1979 | McCormick | |
| 4,228,006 A * | 10/1980 | Hanna | E03B 1/04 |
| | | | 210/167.3 |
| 5,721,383 A * | 2/1998 | Franklin | G01F 1/46 |
| | | | 73/861.79 |
| 2005/0072467 A1 | 4/2005 | Aylward et al. | |

(Continued)

FOREIGN PATENT DOCUMENTS

| | | |
|---|---|---|
| EP | 0855473 B1 | 3/2003 |
| WO | 1997033676 A1 | 9/1997 |
| WO | 2020020455 A1 | 1/2020 |

OTHER PUBLICATIONS

Buoy™ Whole Home Water Controller, Give Homeowners the Smart Way to Help Control Their Water, 03-00478 | TG | 12/19, Resideo Technologies, Inc., 2019.

(Continued)

*Primary Examiner* — Tuan N Nguyen
(74) *Attorney, Agent, or Firm* — Greenberg Traurig, LLP; Ryan D. Sharp; David J. Dykeman

(57) ABSTRACT

A method includes detecting, by a fresh water controller installed in a fresh water subsystem, a fresh water consumption in the fresh water subsystem and providing a respective first output signal to a grey water controller. The method includes determining, by a grey water controller based on the first output signal provided by the fresh water controller a control signal for the waste water diverter to switch the same either into the black water status or into the grey water status.

14 Claims, 8 Drawing Sheets

(56) References Cited

U.S. PATENT DOCUMENTS

Figure 1:
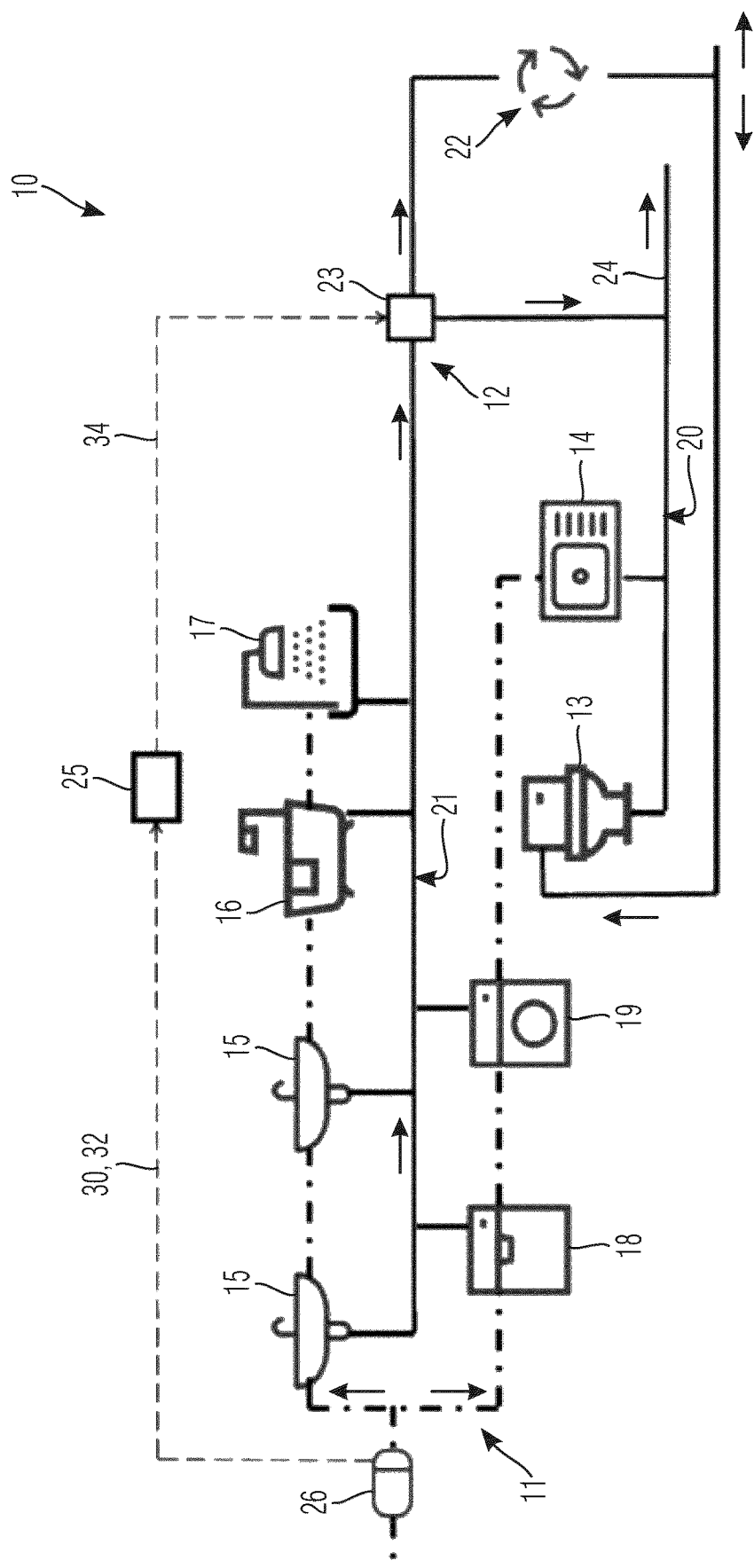

2012/0199220 A1    8/2012   Knepp et al.
2018/0354811 A1   12/2018   Vielma

OTHER PUBLICATIONS

International Search Report and Written Opinion in International PCT Application No. PCT/EP2021/060962 mailed Jul. 9, 2021.

\* cited by examiner

METHOD AND CONTROLLER FOR OPERATING A WATER SYSTEM AND WATER SYSTEM

CROSS-REFERENCE TO RELATED APPLICATIONS

This application is a U.S. National Phase patent application under 35 U.S.C. 371 of International Application No. PCT/EP2021/060962 filed Apr. 27, 2021, which claims the benefit of and priority to European Patent Application No. 20173085.0, filed on May 6, 2020, each of which are incorporated herein by reference in their entireties.

The invention relates to a method for operating a water system. Further on, the invention relates to a controller for operating a water system and to a water system.

US 2012/0199220 A1 relates to a system for processing and distributing grey water. First water consumers like a toilet generate black water as waste water. The black water is provided to a drain. Second water consumers like a bathtub or a washing machine generate grey water as waste water. The grey water flows through a grey water diverter. The grey water diverter directs the grey water either to the drain or to a filter. The grey water treated by the filter falls into a surge tank. The toilet uses flush water provided in a flush water storage tank. The surge tank and the flush water storage tank are connected by a piping. A sump pump is installed within the surge tank. The sump pump in configured to pump water from the surge tank into the flush water storage tank, wherein said water is treated by a fine filter and a sanitizer.

EP 0 855 473 B1 discloses a device and process for reusing grey water. Grey water prided by a water consumer like a bathtub is provided to a grey water diverter. The grey water diverter directs the grey water either to the drain or to a water tank. The water tank is also connected to a fresh water pipe. The water stored within the tank can be used as flush water for a toilet.

US 2018/0354811 A1 discloses a water recycling system and method. Grey water provided by water consumers is tested for recyclability. Sensors decide how to route untreated grey water through treatment. Treatments include filtration, heating cycles and cooling cycles. Once treated, the treated grey water is routed to grey water tanks where it is stored for later use in a toilet and garden landscaping.

The leaflet Buoy™ Whole Home Water Controller, GIVE HOMEOWNERS THE SMART WAY TO HELP CONTROL THEIR WATER, 03-00478|TG|12/19, Resideo Technologies, Inc., 2019 discloses a fresh water controller being installed in a fresh water pipe and being configured to detect a fresh water consumption. Said fresh water controller is further configured to detect the respective water consumer causing the fresh water consumption. The Buoy™ fresh water controller can e.g. identify if a fresh water consumption is caused by a dish washer, shower or other water consumers.

Against this background, a novel method and controller for operating a water system and a water system are provided allowing a more effective reuse of grey water.

The invention provides a method for operating a water system.

The water system comprises a fresh water subsystem being configured to provide fresh water to water consumers, wherein first water consumers generate black water as waste water, and wherein second water consumers generate grey water or black water as waste water.

The water system further comprises a waste water subsystem being configured to receive the waste water from the water consumers.

The waste water subsystem comprises a waste water diverter being configured to provide in a black water status of the waste water diverter waste water to a drain thereby treating waste water as black water, and to provide in a grey water status of the waste water diverter waste water to a grey water tank thereby treating waste water as grey water.

The water system comprises further a fresh water controller installed in the fresh water subsystem.

The method comprises the following steps:

Detect by the fresh water controller being installed in the fresh water subsystem a fresh water consumption in the fresh water subsystem and provide a respective first output signal to a grey water controller.

Determine by the grey water controller on basis of the first output signal provided by the fresh water controller a control signal for the waste water diverter to automatically switch the same either into the black water status or into the grey water status.

According to the present invention, the waste water diverter is automatically switched between the black water status and the grey water status on basis of an output signal provided by the fresh water controller being installed in the fresh water subsystem. The Buoy™ fresh water controller may be used as fresh water controller.

The present invention allows to automatically switch the grey water diverter and to thereby improve the water quality of the reused grey water. This reduces or eliminates the need of grey water treatment of the reused grey water.

According to a first embodiment, the waste water subsystem is a dual drainage subsystem having a black water piping to which the first water consumers are connected and a grey water piping to which the second water consumers are connected, wherein in the black water status of the waste water diverter the grey water piping is connected to the black water piping thereby bypassing the grey water tank, and wherein in the grey water status of the waste water diverter the grey water piping is disconnected from the black water piping but connected to the grey water tank.

According to a second embodiment, the waste water subsystem is a single drainage subsystem having a common piping to which the first water consumers and the second water consumers are connected, wherein in the black water status of the waste water diverter the common piping is connected to the drain thereby bypassing the grey water tank, and wherein in the grey water status of the waste water diverter the common piping is disconnected from the drain but connected to the grey water tank. In connection with said second embodiment, the single drainage subsystem or the fresh water subsystem comprises for each first water consumer an individual flow sensor detecting water consumption of the respective first water consumer, wherein the waste water diverter is only switched into the grey water status when no water consumption is detected by the individual flow sensor of each first water consumer.

The invention can be used in a water system having a dual drainage subsystem as waste water subsystem or in a water system having a single drainage subsystem as waste water subsystem.

Preferably, the method comprises the following additional method steps: Detect by a common flow sensor being installed in the waste water subsystem a waste water flow in the waste water subsystem and provide a respective second output signal to the grey water controller. Determining by the grey water controller on basis of the first output signal provided by the fresh water controller and on basis of the second output signal provided by the common flow sensor the control signal for the waste water diverter to switch the same either into the black water status or into the grey water status. The second output signal can be used to verify the first output signal. E.g., if the fresh water controller detects a fresh water consumption within the fresh water subsystem and if the common flow sensor detects no waste water flow within the waste water subsystem, a fresh water consumption in the outside, e.g. in the garden landscaping, can be detected. In such a situation the waste water diverter is automatically switched into the black water status.

According to a further development of the invention, if fresh water consumption is detected by the fresh water controller, then the following additional method steps are preferred: Detect by the fresh water controller the respective water consumer causing the fresh water consumption and provide a respective third output signal to the grey water controller. Determining by the grey water controller on basis of the first output signal and on basis of the third output signal the control signal for the waste water diverter to switch the same either into the black water status or into the grey water status. According to this further development, the fresh water controller provides the third output signal which identifies the water consumer causing the fresh water consumption. This allows to further improve the water quality of the reused grey water. This further reduces or eliminates the need of grey water treatment of the reused grey water. The Buoy™ fresh water controller may be used as fresh water controller to detect or identify the respective water consumer causing the fresh water consumption.

The novel controller for operating a water system is defined in the claims. The novel water system for operating a water system is defined in the claims.

Figure 2:
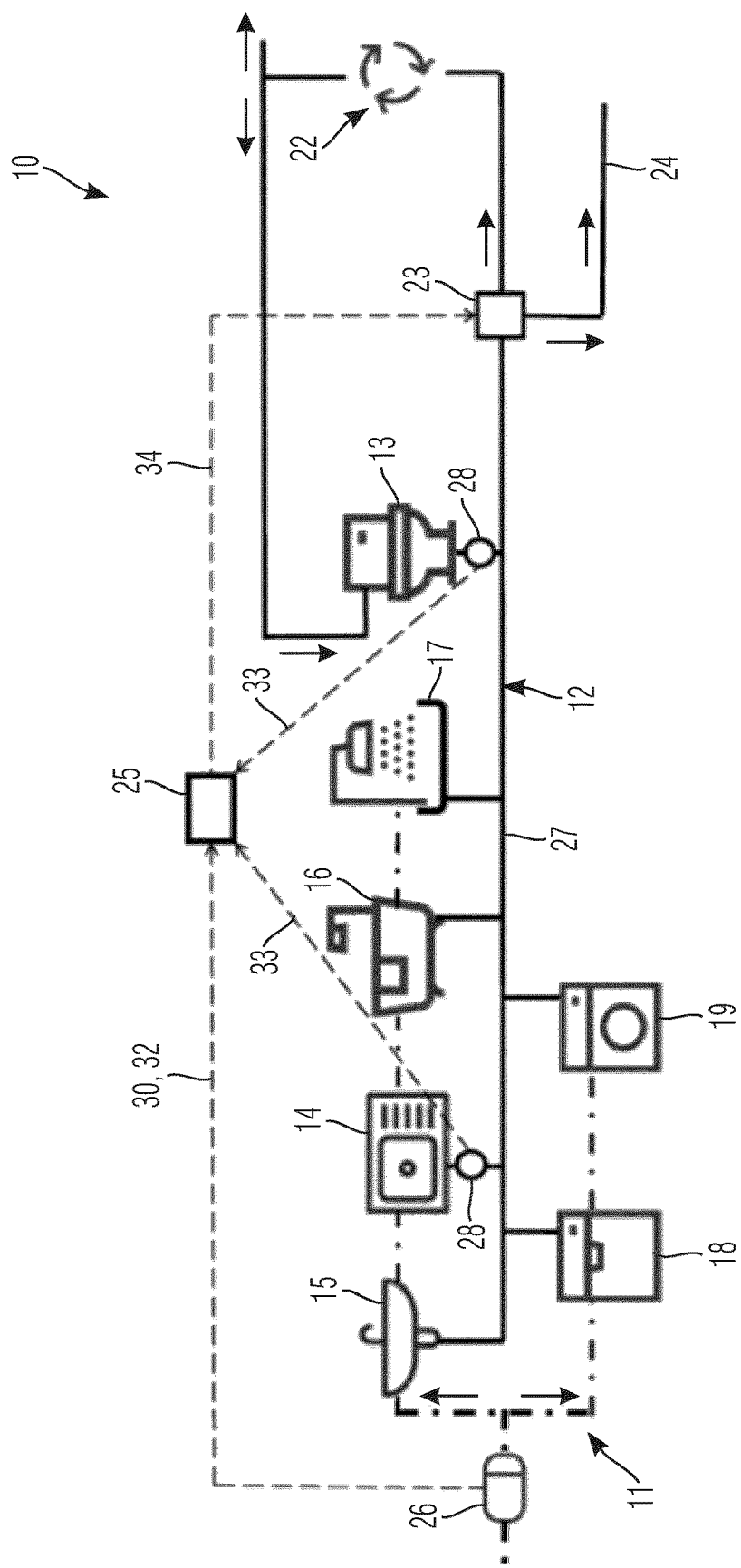
Figure 3:
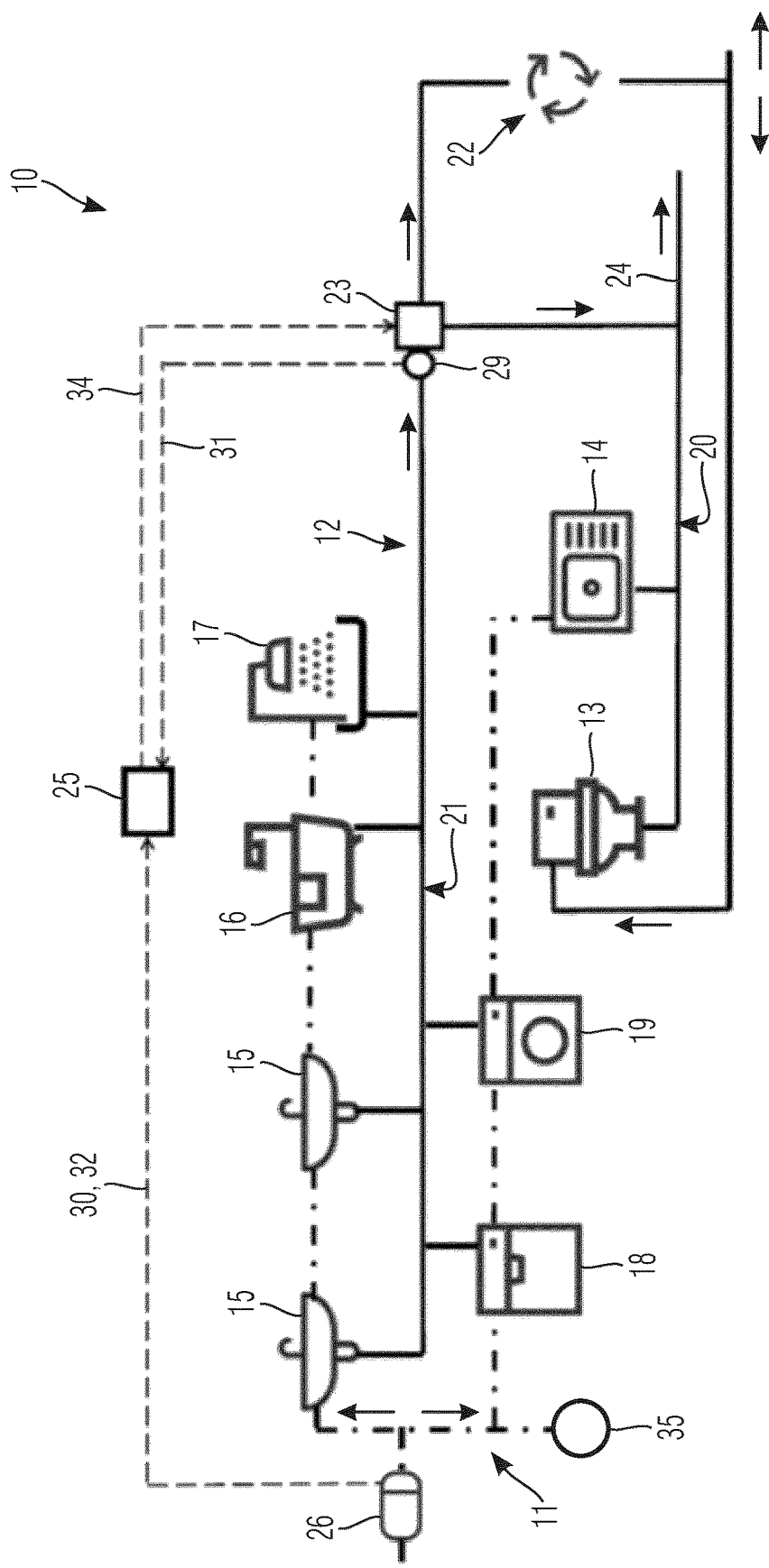
Figure 4:
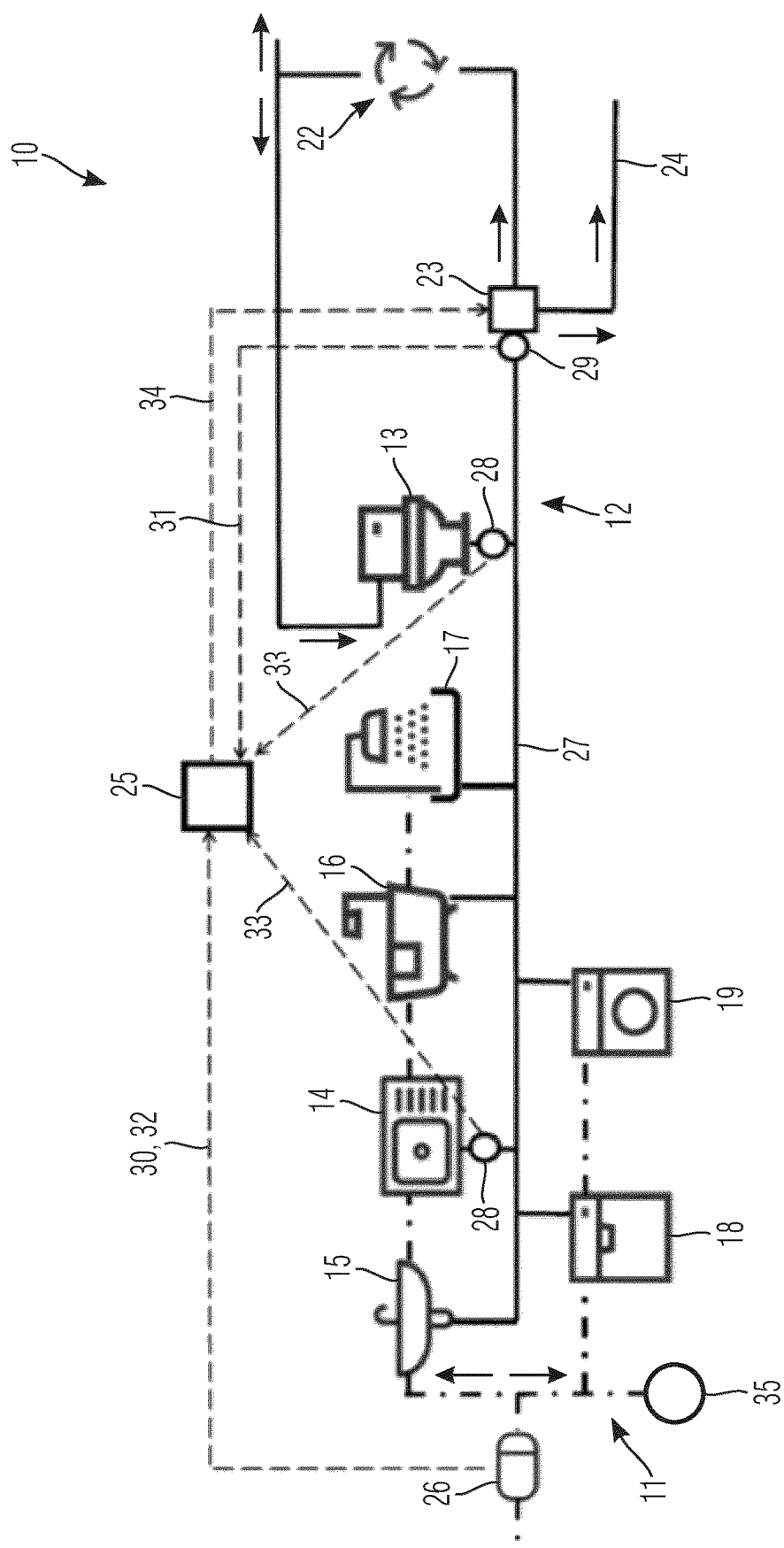
Figure 5:
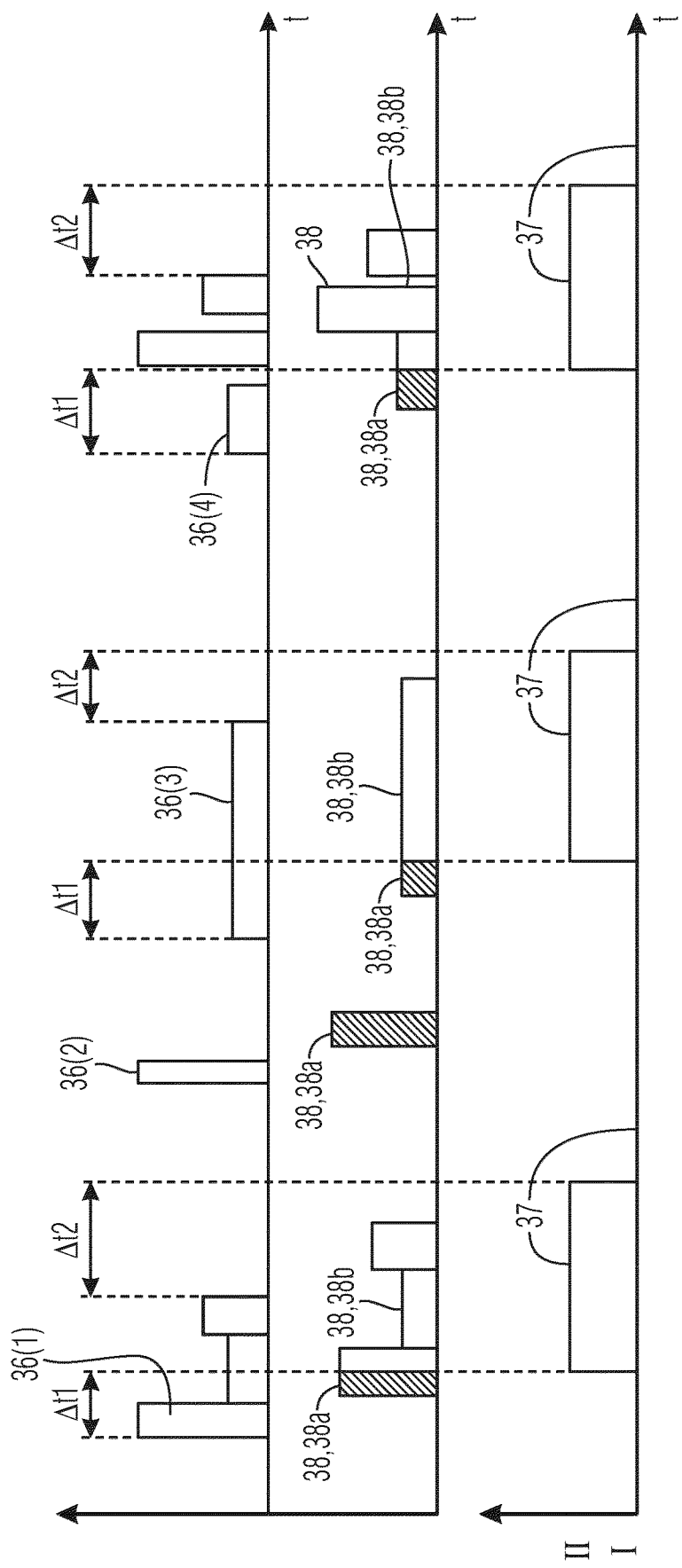
Figure 6:
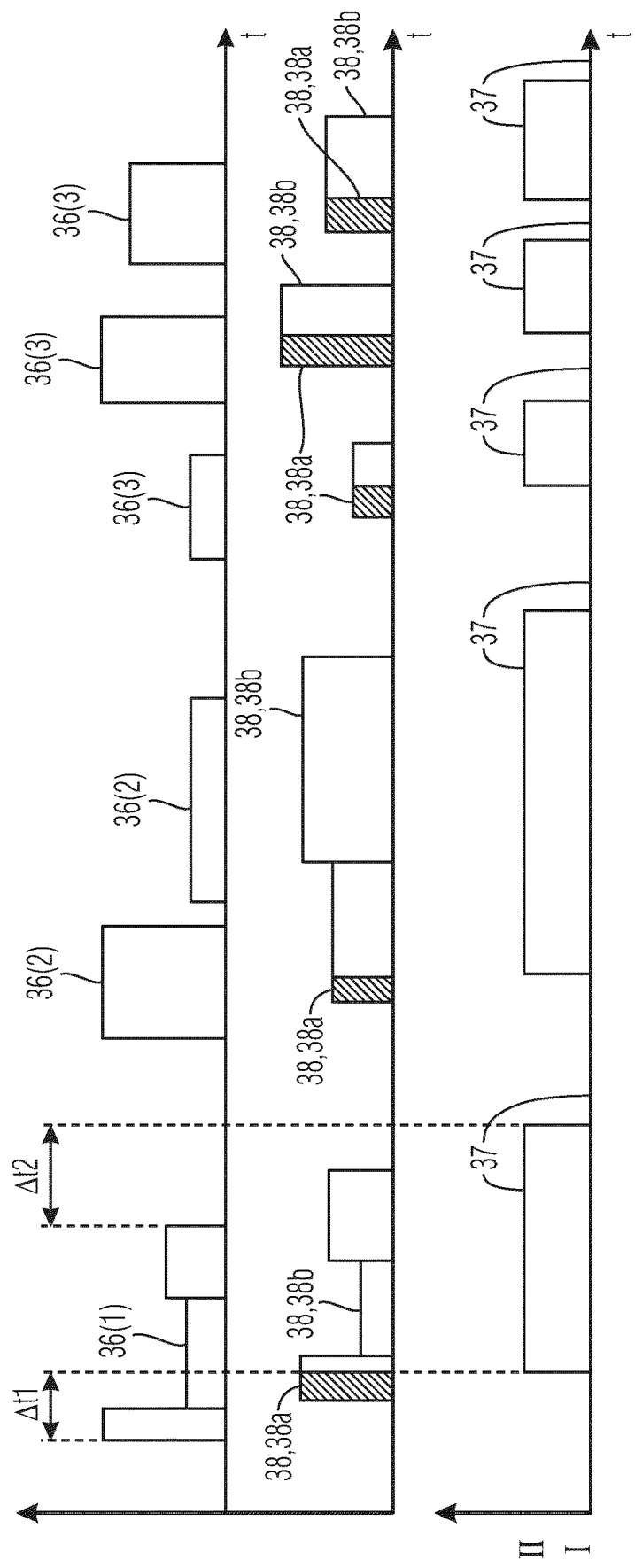
Figure 7:
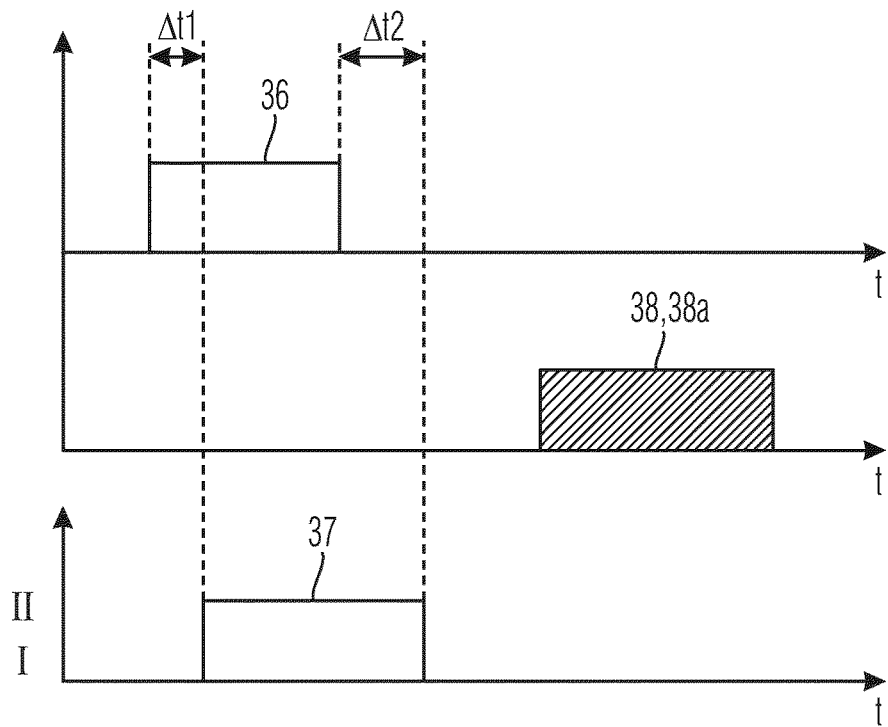
Figure 8:
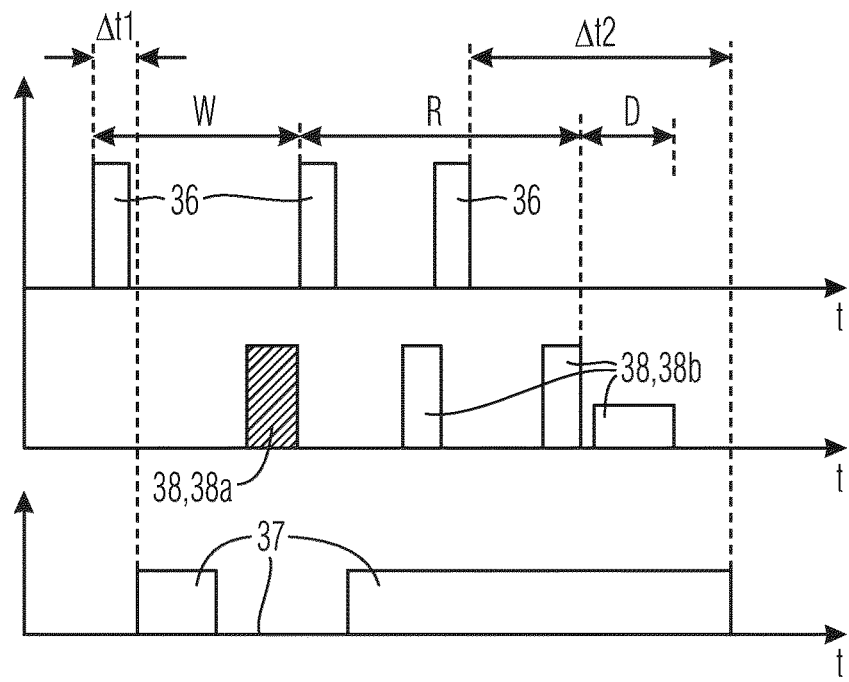
Figure 9:
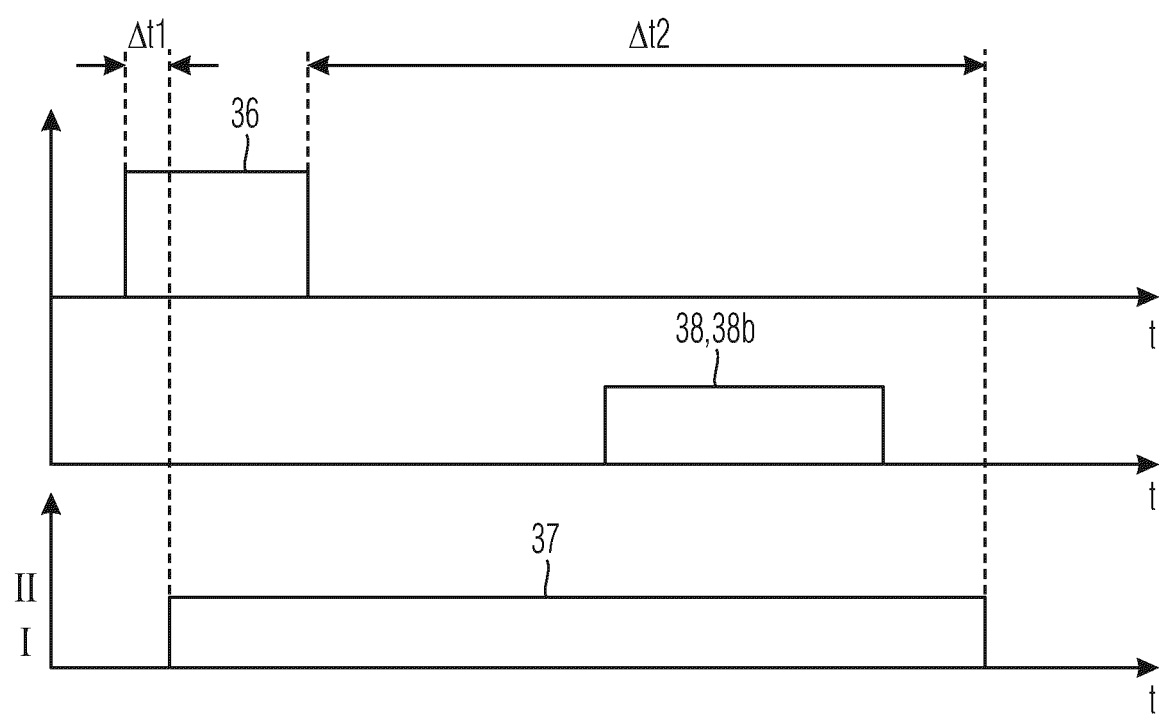

Preferred developments of the invention are provided by the dependent claims and the description which follows. Exemplary embodiments are explained in more detail on the basis of the drawing, in which:

FIG. 1 shows a first water system;
FIG. 2 shows a second water system;
FIG. 3 shows a third water system;
FIG. 4 shows a fourth water system;
FIG. 5 shows time graphs to illustrate a method for operating water system;
FIG. 6 shows further time graphs to illustrate a method for operating water system;
FIG. 7 shows further time graphs to illustrate a method for operating water system;
FIG. 8 shows further time graphs to illustrate a method for operating water system; and
FIG. 9 shows further time graphs to illustrate a method for operating water system.

FIG. 1 shows a water system 10. The water system 10 of FIG. 1 comprises a fresh water subsystem 11 and a waste water subsystem 12. The fresh water subsystem 11 is illustrated in dash-dotted lines. The waste water subsystem 12 is illustrated in solid lines.

The water system 10 of FIG. 1 comprises water consumers 13, 14, 15, 16, 17, 18, 19. The fresh water subsystem 11 is configured to provide fresh water to the water consumers 13, 14, 15, 16, 17, 18, 19. The water consumers 13, 14, 15, 16, 17, 18, 19 generate waste water when using the fresh water. The waste water subsystem 12 is configured to receive the waste water from the water consumers 13, 14, 15, 16, 17, 18, 19.

First water consumers 13, 14 generate black water as waste water. FIG. 1 shows as exemplary first water consumers 13, 14 a toilet 13 and a kitchen sink 14. The toilet 13 uses grey water as flush water, wherein the grey water is stored in a grey water tank 22. There may be grey water treatment system behind or in front of the grey water tank 22. The toilet 13 may also use fresh water as flush water. The kitchen sink 14 uses fresh water.

Second water consumers 15, 16, 17, 18, 19 generate grey water or black water as waste water. FIG. 1 shows as exemplary second water consumers 15, 16, 17, 18, 19 wash basins 15, a bathtub 16, a shower 17, a dish washer 18 and a washing machine 19. The second water consumers 15, 16, 17, 18, 19 use fresh water provided by the fresh water subsystem 11.

The waste water subsystem 12 shown in FIG. 1 is a dual drainage subsystem. The same comprises a black water piping 20 and a grey water piping 21. The first water consumers 13, 14 are connected black water piping 20. The second water consumers 15, 16, 17, 18, 19 are connected to the grey water piping 21.

The waste water subsystem 12 shown in FIG. 1 comprises a waste water diverter 23. The waste water diverter 23 is configured to provide in a black water status of the waste water diverter 23 the waste water to a drain 24 thereby treating the waste water as black water. The waste water diverter 23 is further configured to provide in a grey water status of the waste water diverter 23 the waste water to the grey water tank 22 thereby treating the waste water as grey water.

In the waste water subsystem 12 shown in FIG. 1, in the black water status of the waste water diverter 23 the grey water piping 21 is connected to the black water piping 20 thereby bypassing the grey water tank 22 and directing the waste water of the second water consumers 15, 16, 17, 18, 19 to the drain 24. In the grey water status of the waste water diverter 23 the grey water piping 21 is disconnected from the black water piping 20 thereby directing waste water of the second water consumers 15, 16, 17, 18, 19 to the grey water tank 22.

The water system 10 shown in FIG. 1 further comprises a fresh water controller 26 being installed in the fresh water subsystem 11. The fresh water controller 26 is configured to at least detect a fresh water consumption in the fresh water subsystem 11 and to provide a respective output signal 30—hereinafter called first output signal 30—to a grey water controller 25. The fresh water controller 26 may be further configured to detect the respective water consumer causing the fresh water consumption and to provide a respective output signal 32—hereinafter called third output signal 32—to the grey water controller 25. The fresh water controller 25 may be a Buoy™ fresh water controller.

FIG. 3 shows a modification of the water system 10 of FIG. 1 having a common flow sensor 29. The common flow sensor 29 is installed in the waste water subsystem 12 and is configured to detect a waste water flow in the waste water subsystem 12 and to provide a respective output signal—hereinafter called second output signal 31—to the grey water controller 25.

FIGS. 2 and 4 show water systems 10 also comprising a fresh water subsystem 11 and a waste water subsystem 12. The fresh water subsystem 11 is illustrated in dash-dotted lines. The waste water subsystem 12 is illustrated in solid lines.

The water systems 10 of FIGS. 2, 4 comprises water consumers 13, 14, 15, 16, 17, 18, 19. The fresh water subsystem 11 is configured to provide fresh water to the water consumers 13, 14, 15, 16, 17, 18, 19. The water consumers 13, 14, 15, 16, 17, 18, 19 generate waste water when using the fresh water. The waste water subsystem 12 is configured to receive the waste water from the water consumers 13, 14, 15, 16, 17, 18, 19.

First water consumers 13, 14 generate black water as waste water. FIGS. 2, 4 shows as exemplary first water consumers 13, 14 a toilet 13 and a kitchen sink 14. The toilet 13 uses grey water as flush water, wherein the grey water is stored in a grey water tank 22. There may be grey water treatment system behind or in front of the grey water tank 22. The toilet 13 may also use fresh water as flush water. The kitchen sink 14 uses fresh water.

Second water consumers 15, 16, 17, 18, 19 generate grey water or black water as waste water. FIGS. 2, 4 show as exemplary second water consumers 15, 16, 17, 18, 19 a wash basin 15, a bathtub 16, a shower 17, a dish washer 18 and a washing machine 19. The second water consumers 15, 16, 17, 18, 19 use fresh water provided by the fresh water subsystem 11.

The waste water subsystems 12 shown in FIGS. 2, 4 is a single drainage subsystem. The same comprises a common piping 27. The first water consumers 13, 14 and the second water consumers 15, 16, 17, 18, 19 are all connected to the common piping 27.

The waste water subsystem 12 comprises a waste water diverter 23.

The waste water diverter 23 is configured to provide in a black water status of the waste water diverter 23 the waste water to a drain 24 thereby treating the waste water as black water. The waste water diverter 23 is further configured to provide in a grey water status of the waste water diverter 23 the waste water to the grey water tank 22 thereby treating the waste water as grey water.

In the waste water subsystems 12 shown in FIGS. 2 and 4, in the black water status of the waste water diverter 23 the common piping 27 is connected to the drain 24 and disconnected to the grey water tank 22 thereby bypassing the grey water tank 22. In the grey water status of the waste water diverter 23 the common piping 27 is disconnected from the drain 24 and connected to the grey water tank 22.

The water systems 10 shown in FIG. 2, 4 further comprise a fresh water controller 26 being installed in the fresh water subsystem 11. The fresh water controller 26 is configured to at least detect a fresh water consumption in the fresh water subsystem 11 and to provide a respective output signal 30—hereinafter called first output signal 30—to the grey water controller 25. The fresh water controller 26 may be further configured to detect the respective water consumer causing the fresh water consumption and to provide a respective output signal 32—hereinafter called third output signal 32—to the grey water controller 25. The fresh water controller 25 may be the Buoy™ fresh water controller.

The water systems 10 shown in FIG. 2, 4 further comprise individual flow sensors 28 for each first water consumer 13, 14. The individual flow sensors 28 detect water consumption of the respective first water consumer 13, 14 by detecting waste water flow of the respective first water consumer 13, 14. Each individual flow sensor 28 provides a respective output signal—hereinafter called fourth output signal 33—to the grey water controller 25. The individual flow sensors 28 may also be part of the fresh water subsystem 11 detecting fresh water consumption by the respective water consumer 13, 14.

FIG. 4 shows a modification of the water system 10 of FIG. 2 having the common flow sensor 29. The common flow sensor 29 is installed in the waste water subsystem 12 and is configured to detect a waste water flow in the waste water subsystem 12 and to provide a respective output signal—hereinafter called second output signal 31—to the grey water controller 25.

The method for operating a water system as shown in FIGS. 1 to 4 comprises at least the following steps:

Detect by the fresh water controller 26 being installed in the fresh water subsystem 11 a fresh water consumption in the fresh water subsystem 11 and provide the respective first output signal 30 to the grey water controller 25.

Determine by the grey water controller 25 on basis of the first output signal 30 provided by the fresh water controller 26 a control signal 34 for the waste water diverter 23 to automatically switch the same either into the black water status or into the grey water status. When fresh water consumption in the fresh water subsystem 11 is detected by the fresh water controller 26, then the waste water diverter 23 is automatically switched into the grey water status by the control signal 34 provided by the grey water controller 25.

When no fresh water consumption in the fresh water sub-system 11 is detected by the fresh water controller 26, then the waste water diverter 23 is automatically switched into the black water status by the control signal 34 provided by the grey water controller 25.

In the water systems 10 of FIGS. 2, 4 having the individual flow sensors 28 for each first water consumer 13, 14, the grey water controller 25 determines the control signal 34 for the waste water diverter 23 on basis of the first output signal 30 provided by the fresh water controller 26 and on basis of the fourth output signals 33 provided by the individual flow sensors 28. The waste water diverter 23 is only switched into the grey water status when no water consumption is detected by the individual flow sensor 28 of each first water consumer 13, 14.

In the water systems 10 of FIGS. 3, 4 having the common flow sensor 29, the grey water controller 25 determines the control signal 34 for the waste water diverter 23 on basis of the first output signal 30 provided by the fresh water controller 26 and on basis of the second output signal 31 provided by the common flow sensor 29. The second output signal 31 provided by the common flow sensor 29 is then used to verify the first output signal 30 provided by the fresh water controller 26. When fresh water consumption in the fresh water subsystem 11 is detected by the fresh water controller 26 but no waste water flow in the waste water subsystem 12 is detected by the flow sensor 29, then the waste water diverter 23 is switched into the black water status. In this case there may be fresh water consumption by a fresh water consumer 35 e.g. for garden landscaping in the outside not resulting in a water flow within the waste water subsystem 12.

As mentioned above, the fresh water controller 26 may be further configured to detect the respective water consumer causing the fresh water consumption and to provide a respective third output signal 32 to the grey water controller 25.

If the fresh water controller 26 is configured to detect the respective water consumer causing the fresh water consumption, the grey water controller 25 may then determine on basis of the first output signal 30 and on basis of the third output signal 32 the control signal 34 for the waste water diverter 23 to switch the same either into the black water status or into the grey water status.

Further details of the invention will be described with reference to FIGS. 5 to 9. FIGS. 5 to 9 show temporal curves 36, 37, 38. The temporal curves 36 show a fresh water consumption by a fresh water consumer as a function of time t. The temporal curves 37 show the status of the grey water diverter 23 as a function of time t, wherein the status I corresponds to the black water status and the status II corresponds to the grey water status of the of the grey water diverter 23. The temporal curves 38 illustrate the drainage at the grey water diverter as a function of time t, wherein the hatched areas 38a of the curves 38 illustrate the waste water treated as black water and wherein the non-hatched areas 38b of the curves 38 illustrate the waste water treated as grey water.

FIG. 5 shows exemplary curves 36, 37, 38 when the second water consumer is a wash basin 15 with a drip plug of the wash basin 15 being opened. Four different fresh water consumption 36(1), 36(2), 36(3), 36(4) by a wash basin 15 with an opened drip plug are shown. The grey water diverter 23 is switched into the grey water status II with a first time-delay $\Delta t1$ after the fresh water consumption 36 has started. The first time-delay $\Delta t1$ provides prevention of too often switching the grey water diverter 23. The grey water diverter 23 is switched into the black water status I with a second time-delay $\Delta t2$ after the fresh water consumption 36 is turned off to catch the grey water. So, the waste water diverter 23 is switched into the grey water status II with the first time-delay $\Delta t1$ after detecting by the fresh water controller 26 that there is fresh water consumption. The waste water diverter 23 is switched into the black water status I with the second time-delay $\Delta t2$ after detecting by the fresh water controller 26 that there is no fresh water consumption.

The waste water diverter 23 is kept in the black water status I if the time interval of the detected fresh water consumption is shorter than the first time-delay $\Delta t1$. See second fresh water consumption 36 (2) in FIG. 5.

If in the water systems 10 of FIGS. 2, 4 one of the individual sensors 28 would detect water consumption by a first water consumer 13 or 14, the waste water diverter 23 will switch immediately into the black water status I.

FIG. 7 shows exemplary curves 36, 37, 38 when the second water consumer is a wash basin 15 with a drip plug of the wash basin 15 being closed thereby collecting the water within a bowl of the wash basin 15. The grey water diverter 23 is switched into the grey water status II with a first time-delay $\Delta t1$ after the fresh water consumption 36 has started. The grey water diverter 23 is switched into the black water status I with a second time-delay $\Delta t2$ after the fresh water consumption 36 is turned off to catch the grey water. The waste water collected in the bowl of the wash basin 15 is handled as black water. The water collected in the wash basin 15 with a closed drip plug is usually more contaminated than the waste water generated by a wash basin 15 with an opened drip plug.

If in the water systems 10 of FIGS. 2, 4 one of the individual sensors 28 would detect water consumption by a first water consumer 13 or 14, the waste water diverter 23 will switch immediately into the black water status I.

FIG. 6 show exemplary curves 36, 37, 38 when the second water consumer is shower 17. Three different fresh water consumption 36(1), 36(2), 36(3) by a shower 17 are shown. The grey water diverter 23 is switched into the grey water status II with a first time-delay $\Delta t1$ after the fresh water consumption 36 has started. The grey water diverter 23 is switched into the black water status I with a second time-delay $\Delta t2$ after the fresh water consumption 36 is turned off to catch the grey water.

If in the water systems 10 of FIGS. 2, 4 one of the individual sensors 28 would detect water consumption by a first water consumer 13 or 14, the waste water diverter 23 will switch immediately into the black water status I.

In FIGS. 5, 6 and 7 the grey water controller 25 determines the control signal 34 for the grey water diverter 23 on basis of the first output signal 30 provided by the fresh water controller 26, and in the water systems of FIGS. 2, 4 in addition on basis of the fourth output signals 33 provided by the individual flow sensors 28. In FIGS. 5, 6, and 7 it may be difficult for the fresh water controller 26 to detect the second water consumer causing the fresh water consumption. So, in FIGS. 5, 6 and 7 the grey water controller 25 does not use the above described third output signal of the fresh water controller 26.

FIGS. 8 and 9 show the exemplary curves 36, 37, 38 when the fresh water controller 26 can detect the second water consumer causing the fresh water consumption, namely in FIG. 8 when the second water consumer is a washing machine 19 or dishwasher 18 and in FIG. 9 when the second water consumer is a bathtub 16. In these situations the grey water controller 25 determines the control signal 34 for the grey water diverter 23 on basis of the first and third output signals 30, 32 provided by the fresh water controller 26, and in the water systems of FIGS. 2, 4 in addition on basis of the fourth output signals 33 provided by the individual flow sensors 28.

In FIG. 8, the grey water diverter 23 is switched into the grey water status II with a first time-delay $\Delta t1$ after the fresh water consumption 36 has been started and has been detected by the fresh water controller 26. The fresh water controller 26 detects that the fresh water consumption 36 is caused by the washing machine 18 or dishwasher 19.

The grey water diverter 23 will be switched by the control signal 34 provided by the grey water controller 25 into the black water status I after a washing cycle W of the washing machine 18 or dishwasher 19 has been detected by the fresh water controller 26. The grey water diverter 23 will be switched by the control signal 34 provided by the grey water controller 25 into the grey water status II after a rinsing water cycle R has been detected by the fresh water controller 26. The grey water diverter 23 will be switched by the control signal 34 provided by the grey water controller 25 into the black water status I a defined second time-delay $\Delta t2$ after the fresh water consumption 36 of the rinsing water cycle R is turned off. The second time-delay $\Delta t2$ in FIG. 8 is longer than the second time delay in FIGS. 5, 6, 7. The second time-delay $\Delta t2$ for the washing machine 18 or dishwasher 19 is adapted to a customary waste water amount of the rinsing water cycle R and of a drying cycle D of the washing machine 18 or dishwasher 19. If in the water systems 10 of FIGS. 2, 4 one of the individual sensors 28 would detect water consumption by a first water consumer 13 or 14, the waste water diverter 23 will switch immediately into the black water status I.

In FIG. 9, the grey water diverter 23 is switched into the grey water status II with a first time-delay $\Delta t1$ after the fresh water consumption 36 has been started and detected by the fresh water controller 26. The fresh water controller 26 detects that the fresh water consumption 36 is caused by the bathtub 16. The grey water diverter 23 is kept longer in the grey water status II after the bathtub 16 has been identified as water consumer. The grey water diverter 23 is switched into the black water status I with a second time-delay $\Delta t2$ after the fresh water consumption 36 is turned off. The second time-delay $\Delta t2$ in FIG. 9 is longer than the second time delay in FIGS. 5, 6, 7. The second time-delay $\Delta t2$ for the bathtub 16 is adapted to a customary waste water amount of the bathtub 16. If in the water systems 10 of FIGS. 2, 4 one of the individual sensors 28 would detect water consumption by a first water consumer 13 or 14, the waste water diverter 23 will switch immediately into the black water status I.

The time delays Δt1, Δt2 may be set up individually based on the whole system behavior and end-user preferences. Thereby, the amount of the collected grey water may vary.

The curves 36, 37, 38 shown in FIGS. 5 to 9 are just examples. The functionality may be affected by different preferences of the end-users. E.g. the waste water from the wash basin or shower may be categorized and used as the water from the bathtub.

The present invention provides the above described method for operating a water system. Further on, the invention provides to controller for operating a water system and a water system having such a controller. Said controller is the above describes grey water controller 25. The controller 25 is configured to operate the water system 10 according to above described method.

It may be possible to switch the grey water diverter 23 to grey water status or black water status timely or manually in some special cases. E.g. in case of illness in the household the whole waste water should be handled as black water. The switching of the grey water diverter 23 into the black water status may then be done e.g. via an app on a mobile phone.

In the dual drainage systems of FIGS. 1 and 3, the default status of the grey water diverter 23 may be the grey water status to collect more grey water. Then, the grey water diverter 23 is switched to black water status just in case if the waste water is of black water quality. However, this mode of operation is dangerous and for that the above described mode of operation—in which the default status of the grey water diverter 23 is the black water status—is preferred.

The present invention allows to automatically switch the grey water diverter 23 and to thereby improve the water quality of the reused grey water. This reduces or eliminates the need of grey water treatment of the reused grey water.

LIST OF REFERENCE SIGNS 10 water system
11 fresh water subsystem
12 waste water subsystem
13 first water consumer/toilet
14 first water consumer/kitchen sink
15 second water consumer/wash basin
16 second water consumer/bathtub
17 second water consumer/shower
18 second water consumer/dish washer
19 second water consumer/washing machine
20 black water piping
21 grey water piping
22 grey water tank
23 grey water diverter
24 drain
25 grey water controller
26 fresh water controller
27 common piping
28 individual flow sensor
29 common flow sensor
30 first output signal
31 second output signal
32 third output signal
33 fourth output signal
34 control signal
35 water consumer
36 curve
37 curve
38 curve

The invention claimed is:

1. A method for operating a water system comprising:
   detecting, by a fresh water controller installed in a fresh water subsystem, a fresh water consumption in the fresh water subsystem and providing a respective first output signal to a grey water controller;
   wherein the fresh water subsystem is configured to provide fresh water to water consumers;
   wherein first water consumers generate black water as waste water;
   wherein second water consumers generate grey water or black water as waste water;
   wherein a waste water subsystem includes a waste water diverter configured to provide waste water to a drain when in a black water status;
   wherein the waste water diverter is configured to provide waste water to a grey water tank when in a grey water status;
   detecting, by a common flow sensor installed in the waste water subsystem, a waste water flow in the waste water subsystem and providing a respective second output signal to the grey water controller; and
   determining, by the grey water controller based on the first output signal provided by the fresh water controller, a control signal for the waste water diverter to switch the waste water diverter into one of the black water status or the grey water status;
   wherein the waste water diverter is switched into the grey water status with a first time-delay (Δt1) after detecting by the fresh water controller that there is fresh water consumption;
   wherein the waste water diverter is switched into the black water status with a second time-delay (Δt2) after detecting by the fresh water controller that there is no fresh water consumption.

2. The method as claimed in claim 1,
   wherein the waste water subsystem is a dual drainage subsystem having a black water piping to which the first water consumers are connected and a grey water piping to which the second water consumers are connected,
   wherein when the waste water diverter is in the black water status, the grey water piping is connected to the black water piping thereby bypassing the grey water tank, and
   wherein when the waste water diverter is in the grey water status, the grey water piping is disconnected from the black water piping.

3. The method as claimed in claim 1,
   wherein the waste water subsystem is a single drainage subsystem having a common piping to which the first water consumers and the second water consumers are connected,
   wherein when the waste water diverter is in the black water status, the common piping is connected to the drain thereby bypassing the grey water tank, and
   wherein when the waste water diverter is in the grey water status, the common piping is disconnected from the drain.

4. The method as claimed in claim 3,
   wherein the single drainage subsystem or the fresh water subsystem comprises for each first water consumer an individual flow sensor detecting water consumption of the respective first water consumer, and wherein the waste water diverter is only switched into the grey water status when no water consumption is detected by the individual flow sensor of each first water consumer.

5. The method as claimed in claim 1,
wherein when fresh water consumption in the fresh water subsystem is detected by the fresh water controller, the waste water diverter is switched by the control signal into the grey water status, and
wherein when no fresh water consumption in the fresh water subsystem is detected by the fresh water controller, then the waste water diverter is switched by the control signal into the black water status.

6. The method as claimed in claim 1, comprising:
determining by the grey water controller based on the first output signal provided by the fresh water controller and the second output signal provided by the common flow sensor the control signal for the waste water diverter to switch the waste water diverter into the black water status or the grey water status.

7. The method as claimed in claim 6,
wherein when fresh water consumption in the fresh water subsystem is detected by the fresh water controller but no waste water flow in the waste water subsystem is detected by the common flow sensor, then the waste water diverter is switched into the black water status.

8. The method as claimed in claim 6,
wherein the waste water diverter is kept in the black water status if a time interval of the detected fresh water consumption is shorter than the first time-delay.

9. The method as claimed in claim 8,
wherein if fresh water consumption in the fresh water subsystem is detected by the fresh water controller, the method further comprises:
detecting by the fresh water controller the respective water consumer causing the fresh water consumption and providing a respective third output signal to the grey water controller, and
determining by the grey water controller based on the first output signal and based on the third output signal the control signal for the waste water diverter to switch the waste water diverter to one of the black water status or the grey water status.

10. The method as claimed in claim 9,
wherein if fresh water consumption by a dish washer or by a washing machine is detected by the fresh water controller, the method further comprises:
switching the grey water diverter into the black water status during a washing cycle (W) of the dish washer or the washing machine, and
switching the grey water diverter into the grey water status during a rinsing cycle (R) and drying cycle (D) of the dish washer or the washing machine.

11. The method as claimed in claim 9,
wherein if fresh water consumption by a dish washer, a washing machine, or a bathtub is detected by the fresh water controller, the method further comprises increasing the second time-delay.

12. A controller for operating a water system, wherein the water system comprises a fresh water subsystem being configured to provide fresh water to water consumers, wherein first water consumers generate black water as waste water, wherein second water consumers generate grey water or black water as waste water, a waste water subsystem being configured to receive the waste water from the water consumers, a waste water diverter, wherein the waste water diverter is configured to provide in a black water status of the waste water diverter waste water to a drain thereby treating waste water as black water, and provide in a grey water status of the waste water diverter waste water to a grey water tank thereby treating waste water as grey water,
wherein the controller is configured to:
determine, based on a first output signal provided by a fresh water controller, a control signal for the waste water diverter to switch the waste water diverter into the black water status or into the grey water status,
wherein the fresh water controller is installed in the fresh water subsystem and is configured to detect fresh water consumption in the fresh water subsystem,
wherein a common flow sensor is installed in the waste water subsystem and is configured to detect a waste water flow in the waste water subsystem,
switch into the grey water status with a first time-delay ($\Delta t1$) after detecting by the fresh water controller that there is fresh water consumption;
switch into the black water status with a second time-delay ($\Delta t2$) after detecting by the fresh water controller that there is no fresh water consumption.

13. A water system comprising:
a fresh water subsystem being configured to provide fresh water to water consumers,
wherein first water consumers generate black water as waste water,
wherein second water consumers generate grey water or black water as waste water,
a waste water subsystem being configured to receive the waste water from the water consumers,
a waste water diverter installed in the waste water subsystem, the waste water diverter being configured to:
provide in a black water status of the waste water diverter waste water to a drain thereby treating waste water as black water, and
provide in a grey water status of the waste water diverter waste water to a grey water tank thereby treating waste water as grey water,
a fresh water controller installed in the fresh water subsystem being configured to detect fresh water consumption in the fresh water subsystem and to provide a respective first output signal,
a grey water controller being configured to operate the water system according to the method of claim 1.

14. A method for operating a water system comprising:
detecting, by a fresh water controller installed in a fresh water subsystem, a fresh water consumption in the fresh water subsystem and providing a respective first output signal to a grey water controller;
wherein the fresh water subsystem is configured to provide fresh water to water consumers;
wherein first water consumers generate black water as waste water;
wherein second water consumers generate grey water or black water as waste water;
wherein a waste water subsystem includes a waste water diverter configured to provide waste water to a drain when in a black water status;
wherein the waste water diverter is configured to provide waste water to a grey water tank when in a grey water status;
determining, by the grey water controller based on the first output signal provided by the fresh water controller, a control signal for the waste water diverter to switch the waste water diverter into one of the black water status or the grey water status;

wherein when fresh water consumption in the fresh water subsystem is detected by the fresh water controller:

detecting by the fresh water controller a respective water consumer causing the fresh water consumption and providing a respective second output signal to the grey water controller, determining by the grey water controller based on the first output signal provided by the fresh water controller and the second output signal provided by a common flow sensor the control signal for the waste water diverter to switch the waste water diverter into the black water status or the grey water status;

wherein if fresh water consumption by a dish washer or by a washing machine is detected by the fresh water controller:

switching the grey water diverter into the black water status during a washing cycle (W) of the dish washer or the washing machine, and switching the grey water diverter into the grey water status during a rinsing cycle (R) and drying cycle (D) of the dish washer or the washing machine.

\* \* \* \* \*